US012803253B2

(12) United States Patent
Lin et al.

(10) Patent No.: US 12,803,253 B2
(45) Date of Patent: Nov. 17, 2026

(54) WIRE STRIPPER

(71) Applicant: NUSHARP INC., Taichung City (TW)

(72) Inventors: Chong-Jiang Lin, Taichung City (TW); Mu-Chun Huang, Taichung City (TW); Tsung-Hao Kuo, Taichung City (TW)

(73) Assignee: NUSHARP INC., Taichung City (TW)

( * ) Notice: Subject to any disclaimer, the term of this patent is extended or adjusted under 35 U.S.C. 154(b) by 223 days.

(21) Appl. No.: 18/956,126

(22) Filed: Nov. 22, 2024

(65) Prior Publication Data

US 2025/0202206 A1 Jun. 19, 2025

(30) Foreign Application Priority Data

Dec. 18, 2023 (TW) ................................ 112149181

(51) Int. Cl.
*H02G 1/12* (2006.01)

(52) U.S. Cl.
CPC ................................ *H02G 1/1212* (2013.01)

(58) Field of Classification Search
CPC ........................... H02G 1/1212; H02G 1/1214
USPC ...................... 81/9, 9.4, 54, 177.8, 473, 489
See application file for complete search history.

(56) References Cited

U.S. PATENT DOCUMENTS 3,827,317 A * 8/1974 Perrino ................ H02G 1/1214 30/90.1
4,799,406 A * 1/1989 Diaz-De-Guerenu-Aguirrebeitia ....... H02G 1/1224 30/90.1
6,012,357 A * 1/2000 John .................... H02G 1/1214 30/90.1
6,029,297 A * 2/2000 French ...................... B25B 7/22 7/127
6,081,953 A * 7/2000 Chou ........................ B25F 1/00 30/90.1
6,089,125 A * 7/2000 Cheng .................. H02G 1/1212 81/9.44
6,588,039 B1 * 7/2003 Bates ........................ B25B 7/02 7/107

(Continued)

FOREIGN PATENT DOCUMENTS

CN 224097304 U * 4/2026
DE 1046133 B * 12/1958

(Continued)

*Primary Examiner* — Robert F Long
(74) *Attorney, Agent, or Firm* — Bruce Stone LLP; Joseph A. Bruce

(57) ABSTRACT

A wire stripper includes: a first clamp component having a first pivot portion, a notch, a first top surface, a first bottom surface and two first side surfaces, with the first top surface having a pressing portion being concave and beside the notch, with the two first side surfaces each having stripping holes; a second clamp component pivotally connected to the first clamp component and having a receiving chamber and an opening in communication with the receiving chamber; a stripping module detachably coupled to the second clamp component and having a first surface and a second surface opposite the first surface, with the first and second surfaces each having at least one pressing groove forming a stripping groove together with the stripping holes, allowing a wire to be penetratingly disposed in the stripping groove; and a blade device for cutting the wire.

6 Claims, 9 Drawing Sheets

(56) References Cited

U.S. PATENT DOCUMENTS

| | | | | |
|---|---|---|---|---|
| 2002/0189020 | A1* | 12/2002 | Bates | H02G 1/1214 7/107 |
| 2004/0118251 | A1* | 6/2004 | Wilson | B25B 7/02 7/107 |
| 2011/0138629 | A1* | 6/2011 | Liu | H02G 1/1224 30/90.1 |
| 2015/0188272 | A1* | 7/2015 | Esterkin | H02G 1/1214 7/107 |
| 2016/0020589 | A1* | 1/2016 | Zinser | H02G 1/1212 81/9.41 |
| 2016/0294168 | A1* | 10/2016 | Hoppe | B25B 7/22 |
| 2021/0006049 | A1* | 1/2021 | Holland-Moritz | H02G 1/1212 |
| 2026/0058446 | A1* | 2/2026 | Melkovitz | B25B 7/02 |

FOREIGN PATENT DOCUMENTS

| | | | | |
|---|---|---|---|---|
| DE | 19635566 | A1 * | 3/1998 | H02G 1/1214 |
| DE | 102017128227 | A1 * | 5/2019 | H02G 1/1236 |
| DE | 102017128228 | A1 * | 5/2019 | H02G 1/1212 |
| DE | 102022134812 | A1 * | 6/2024 | B25B 7/08 |
| DE | 102023104915 | A1 * | 8/2024 | H02G 1/1224 |
| DE | 102024127086 | A1 * | 3/2026 | H02G 1/1214 |
| EP | 2166630 | B1 * | 8/2016 | H02G 1/1212 |
| EP | 4123851 | A1 * | 1/2023 | H02G 1/1214 |
| ES | 2538139 | T3 * | 6/2015 | H02G 1/1212 |
| GB | 1056280 | A * | 1/1967 | H02G 1/1214 |
| IT | 202023000001671 | Y1 * | 11/2024 | |
| WO | WO-2026128815 | A1 * | 6/2026 | H02G 1/1214 |

* cited by examiner

WIRE STRIPPER

BACKGROUND

Field of the Invention

The present disclosure relates to wire strippers, and more particularly to a wire stripper that is applicable to wires of different diameters and time-efficient.

Description of Related Art

Wire strippers are tools used in electronic and electrical engineering to remove the protective coating of an electric wire and thereby expose its inner conductive metal so as to facilitate electrical connection or any other circuit-related work.

However, conventional wire strippers have some drawbacks. First, conventional wire strippers are subjected to size limitations, because one single conventional wire stripper is only applicable to electric wires of one or two diameters. Thus, to handle electric wires of more than two diameters, wire stripper users have to purchase wire strippers of different sizes to the detriment of cost-effectiveness and ease of use. Second, conventional wire strippers have a steep learning curve. Third, conventional wire strippers pose precision and safety issues. A point of stripping and the movement of a user's hand manipulating a conventional wire stripper together narrow down the user's visual field to such an extent that the point of stripping is hidden, rendering it possible for the inner conductive metal to be damaged as a result of protective coating removal. The damage of the inner conductive metal is likely to cause poor electrical connection or any other circuit-related issues, posing a user safety risk. Fourth, regarding the conventional wire strippers, the resistance is located between the effort and the fulcrum to achieve an effort arm longer than the resistance arm; thus, the conventional wire strippers move a load with a relatively small effort, but take more time to move a load (especially a lot of electric wires).

SUMMARY

It is an objective of the disclosure to provide a wire stripper applicable to wires of different diameters to minimize cost and save space.

Another objective of the disclosure is to provide a wire stripper that is time-efficient and works fast.

To achieve the above and other objectives, the disclosure is a wire stripper, comprising a first clamp component, a second clamp component, a stripping module, and a blade device.

The first clamp component has a first pivot portion and a notch. The first clamp component further has a first top surface, a first bottom surface and two first side surfaces. The first bottom surface connects to an edge of each of the two first side surfaces. The first top surface not only connects to another edge of each of the two first side surfaces but also has at least one screw hole and an abutting portion beside the screw hole. The abutting portion is oblique. The first top surface further has a pressing portion that is concave and beside the notch. The two first side surfaces each have a plurality of stripping holes.

The second clamp component has a second pivot portion pivotally connected to the first pivot portion to allow the first clamp component to open or shut relative to the second clamp component, a second top surface, a second bottom surface facing the first bottom surface, a receiving chamber being concave, and an opening penetrating the second top surface and being in communication with the receiving chamber.

The stripping module is detachably coupled to the receiving chamber of the second clamp component. The stripping module has a first surface and a second surface. The first and second surfaces have a first cutting zone and a second cutting zone beside the first cutting zone respectively. The first and second cutting zones each have at least one pressing groove. The pressing grooves and the stripping holes together form at least one stripping groove, allowing a wire to be penetratingly disposed in the stripping groove.

The blade device is detachably fixed to the first clamp component. The blade device has a blade, a plate and at least one screwing element. The blade and the plate are fixed to the abutting portion with the screwing element and lie obliquely relative to the second bottom surface.

Preferably, the second clamp component has a holding chamber being concave and beside the receiving chamber.

Preferably, a resilient element is disposed in the receiving chamber and adapted to abut against the first clamp component.

Preferably, a switch structure is disposed in the receiving chamber and has an operating end, an engaging-fixing end, and a joining portion joining the operating end to the engaging-fixing end. The operating end is adapted to control the engaging-fixing end. The joining portion is adapted to engage with an engaging hole of the first clamp component.

The receiving chamber has a first positioning hole and a second positioning hole. The second positioning hole and the first positioning hole are separated by a distance. The stripping module has at least one stopping block protruding therefrom and a tenon beside the stopping block, with both the stopping block and the tenon adapted to engage with the first positioning hole or the second positioning hole.

The pressing groove has a diameter and a mark indicative of the diameter.

Therefore, according to the disclosure, both the first surface and the second surface of the stripping module have the first cutting zone and the second cutting zone. Both the first cutting zone and the second cutting zone have at least one pressing groove. The pressing grooves come in different diameters to suit wires of different sizes. A pressing portion of the first clamp component enables a user to easily shut the first clamp component and the second clamp component, allows the wire to be received in a plurality of stripping grooves, and allows the user to pull the wire protruding from the stripping grooves, so as to cause the wire to touch the blade. Then, the blade cuts the wire to cause an outer insulating layer of the wire to extend outward along the notch and a wire body of the wire to extend outward along the stripping grooves, allowing the wire to be stripped quickly and in a time-efficient manner.

DETAILED DESCRIPTION

Figure 1:
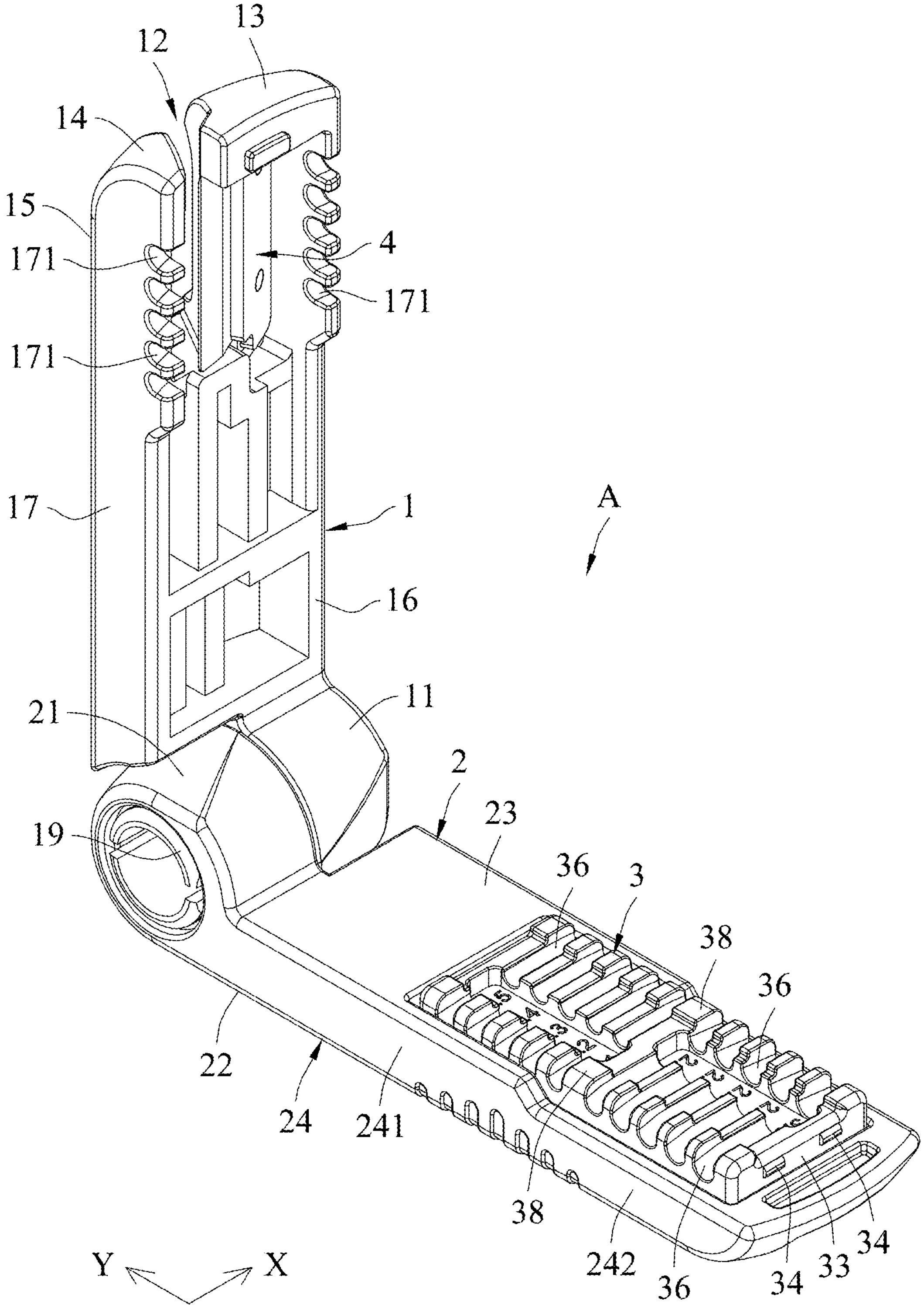
FIG. 1 is a schematic view of a wire stripper according to the first embodiment of the disclosure.
Figure 2:
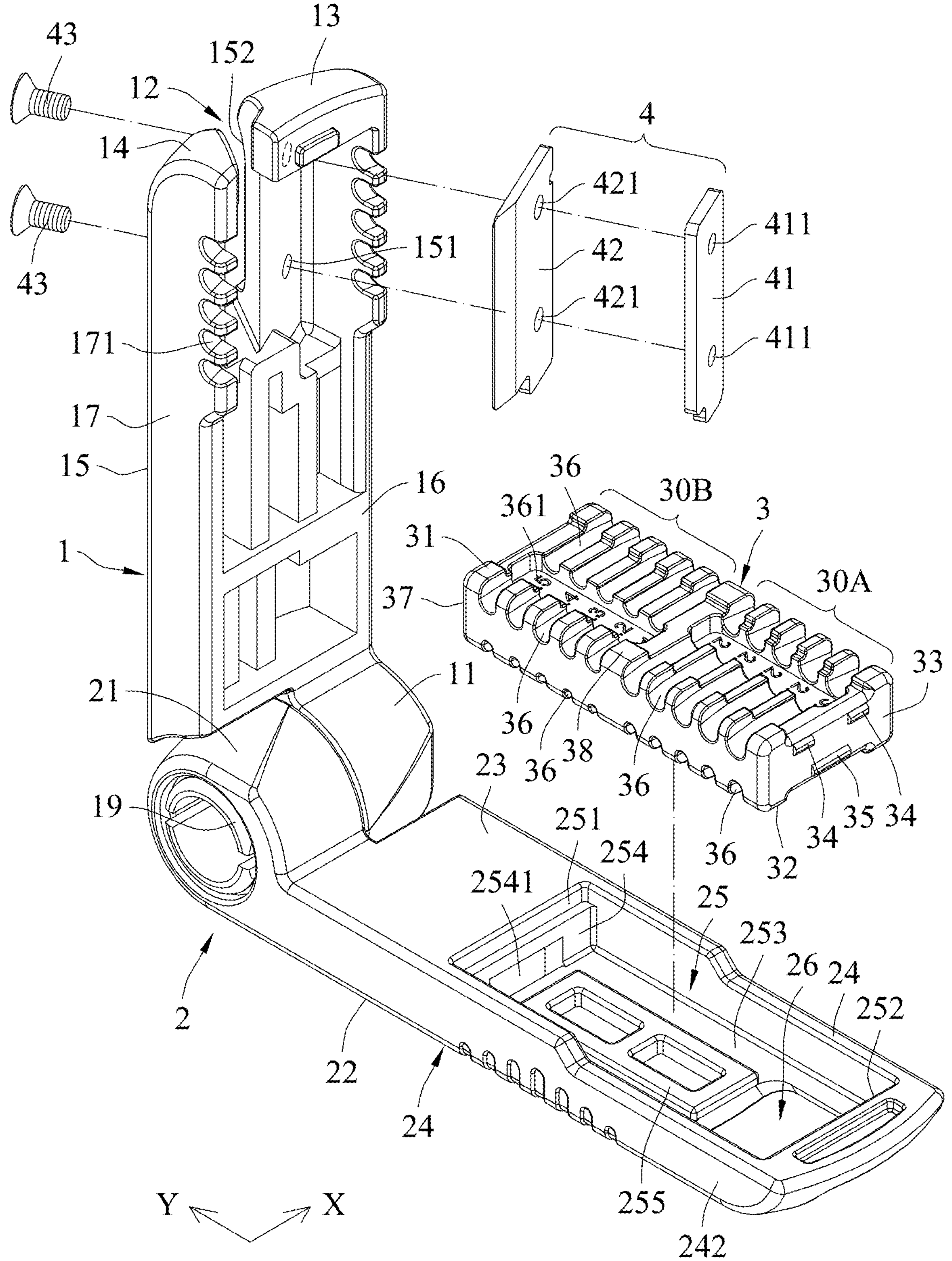
FIG. 2 is an exploded view of the wire stripper according to the first embodiment of the disclosure.

Referring to FIG. 1 and FIG. 2, the disclosure provides a wire stripper A, comprising a first clamp component 1, a second clamp component 2, a stripping module 3 and a blade device 4. The first clamp component 1 and the second clamp component 2 are pivotally connected to each other. The stripping module 3 is disposed at the second clamp component 2, and the blade device 4 is disposed at the first clamp component 1.

Figure 5:
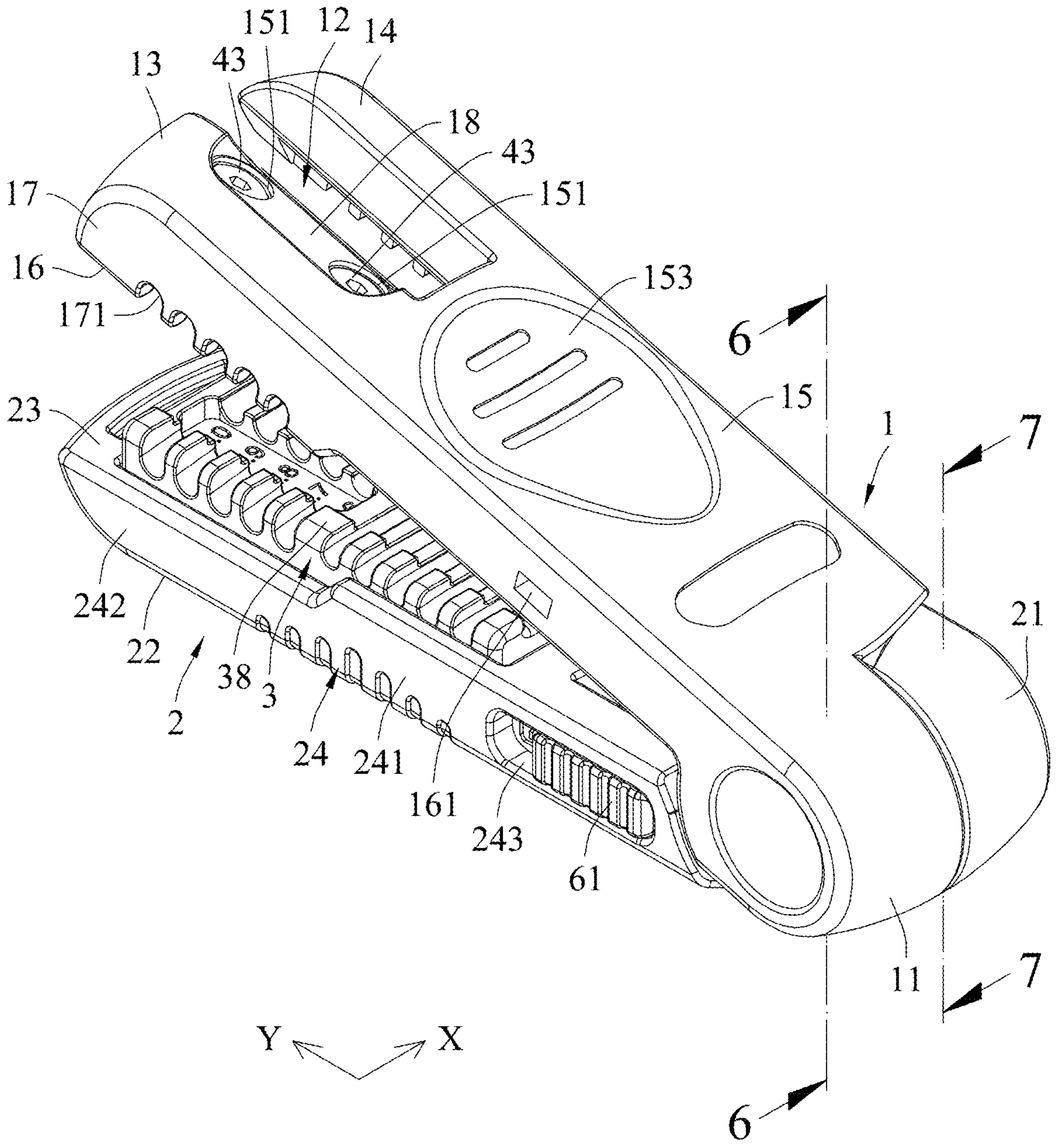
FIG. 5 is a schematic view from another angle of the wire stripper according to the second embodiment of the disclosure.

Referring to FIG. 1 and FIG. 2, one end of the first clamp component 1 is joined to a first pivot portion 11, and the other end of the first clamp component 1 has a notch 12. In this embodiment, the first clamp component 1 and the first pivot portion 11 are integrally formed. The other end of the first clamp component 1 is divided by the notch 12 into a first front end 13 and a second front end 14. A first direction X is defined as the extension direction between the second front end 14 and the first front end 13. The first clamp component 1 has a first top surface 15, a first bottom surface 16 and two first side surfaces 17. Each of the two first side surfaces 17 has one edge connected to the first bottom surface 16 and the other edge connected to the first top surface 15, allowing the first top surface 15 and the first bottom surface 16 to face away from each other. Referring to FIG. 5, the first top surface 15 has an abutting portion 18 and at least one screw hole 151 penetrating the abutting portion 18. The extension direction of the abutting portion 18 is different from the extension direction of the first top surface 15, and thus the abutting portion 18 is oblique relative to the first top surface 15. Both the abutting portion 18 and the screw hole 151 are disposed at the first front end 13. The first top surface 15 further has a pressing portion 153 that is concave. The pressing portion 153 is beside the notch 12. A user can press the pressing portion 153 to cause the first clamp component 1 to move closer to or away from the second clamp component 2. The two first side surfaces 17 have a plurality of stripping holes 171 each and are equal in terms of the number and size of the stripping holes 171. The stripping holes 171 penetrate the two first side surfaces 17.

Figure 8:
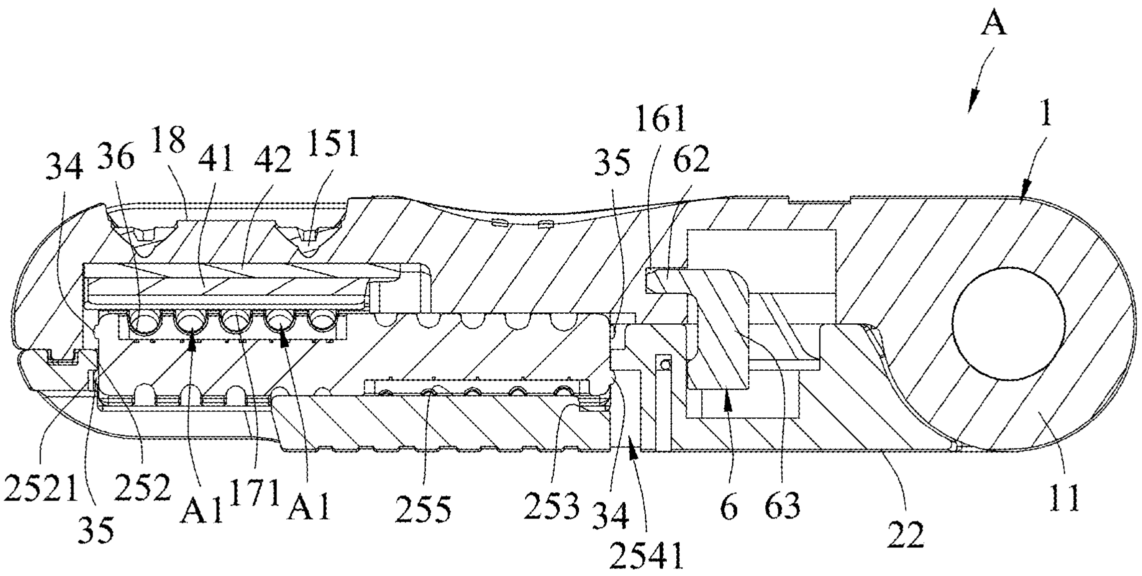
FIG. 8 is a cross-sectional view of the wire stripper shut according to the disclosure.

Referring to FIG. 1, FIG. 2 and FIG. 8, one end of the second clamp component 2 is joined to a second pivot portion 21. In this embodiment, the second clamp component 2 and the second pivot portion 21 are integrally formed, but the disclosure is not limited thereto. The second pivot portion 21 and the first pivot portion 11 are pivotally connected to each other, allowing the first clamp component 1 to open or shut relative to the second clamp component 2. The first pivot portion 11 and the second pivot portion 21 share a pivot 19. In an embodiment, the pivot 19 is disposed at the first pivot portion 11 and inserted into the second pivot portion 21, allowing the first pivot portion 11 to rotate relative to the second pivot portion 21. The second clamp component 2 has a second top surface 22 and a second bottom surface 23 facing away from the second top surface 22. When the wire stripper A is shut, the second bottom surface 23 faces the first bottom surface 16. The second clamp component 2 further comprises two sidewalls 24 lying opposite each other. The two sidewalls 24 each have a first segment 241 and a second segment 242 contiguous to the first segment 241. The first segment 241 is closer to the second pivot portion 21 than the second segment 242 is to the second pivot portion 21. The second segment 242 has a second width, and the first segment 241 has a first width. The first width is greater than the second width. A second direction Y is defined as the transition direction between the first segment 241 and the second segment 242. The second direction Y is perpendicular to the first direction X. Each of the two sidewalls 24 has one edge connected to the second bottom surface 23 and the other edge connected to the second top surface 22. Referring to FIG. 2, the second clamp component 2 further has a receiving chamber 25 being concave and an opening 26 penetrating the second top surface 22. The opening 26 is in communication with the receiving chamber 25. The receiving chamber 25 is beside the second bottom surface 23. Referring to FIG. 2 and FIG. 8, the receiving chamber 25 has a first inner wall 251, a second inner wall 252 and a lowermost surface 253. The first inner wall 251 and the second inner wall 252 are separated by a distance and are parallel. Two edges of the lowermost surface 253 are connected to the first inner wall 251 and the second inner wall 252 respectively. The opening 26 penetrates the lowermost surface 253. The first inner wall 251 and the second inner wall 252 are each connected to the two sidewalls 24. One side of the first inner wall 251 is connected to the second bottom surface 23. The other side of the first inner wall 251 protrudes to form a blocking block 254. The blocking block 254 is connected to the two sidewalls 24 and the lowermost surface 253. The lowermost surface 253 rises to form a raised block 255. The raised block 255 lies between the blocking block 254 and the opening 26. The blocking block 254 has a first positioning hole 2541. Two edges of the second inner wall 252 are connected to the two sidewalls 24 respectively. The second inner wall 252 has a second positioning hole 2521. The second positioning hole 2521 and the first positioning hole 2541 are separated by a distance and are opposite each other.

Figure 3A:
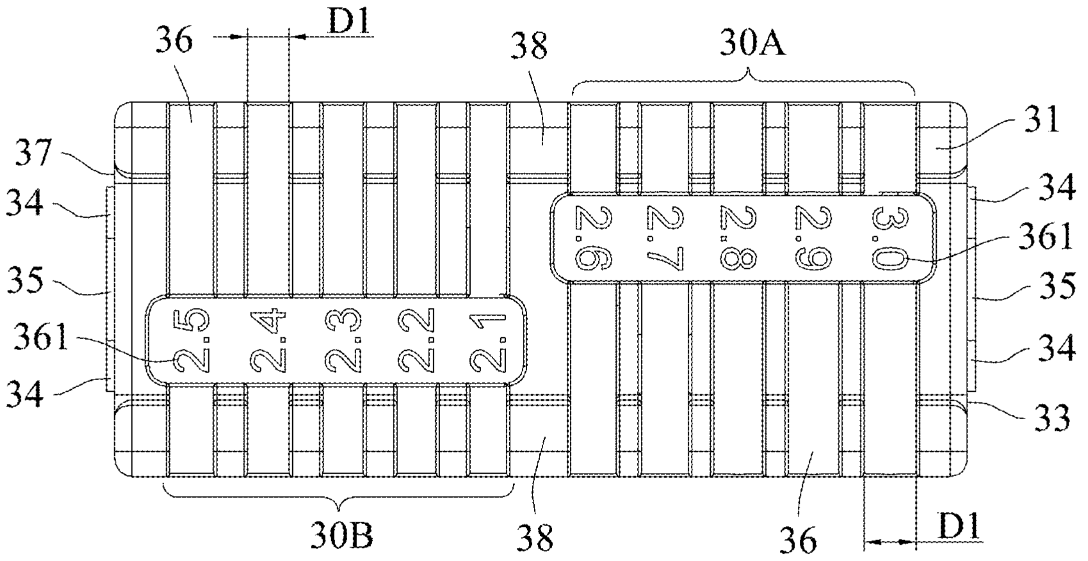
FIG. 3A is an enlarged view of a stripping module.
Figure 3B:
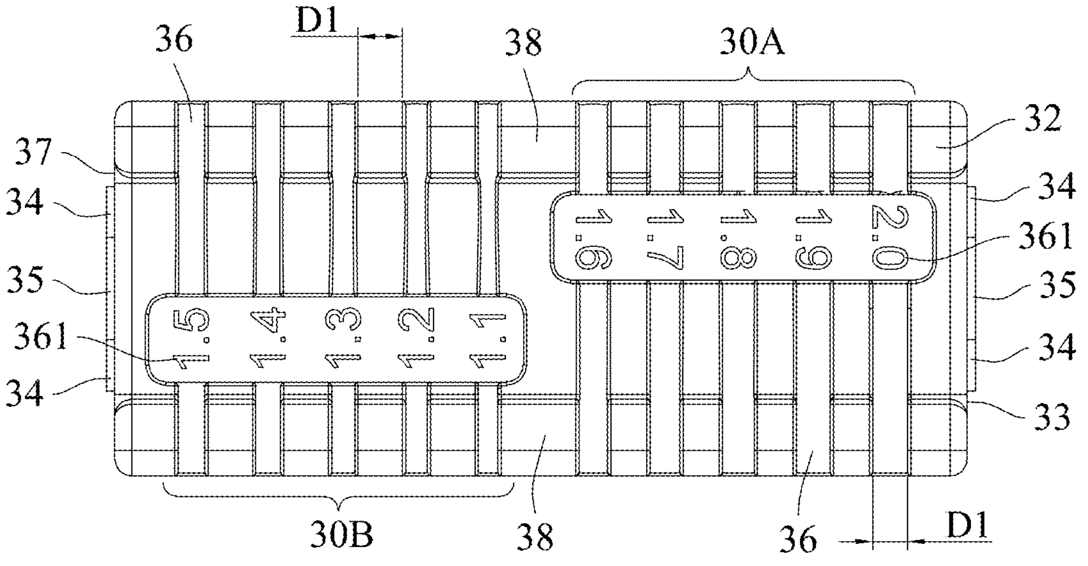
FIG. 3B is an enlarged view of the stripping module viewed from another angle.
Figure 6:
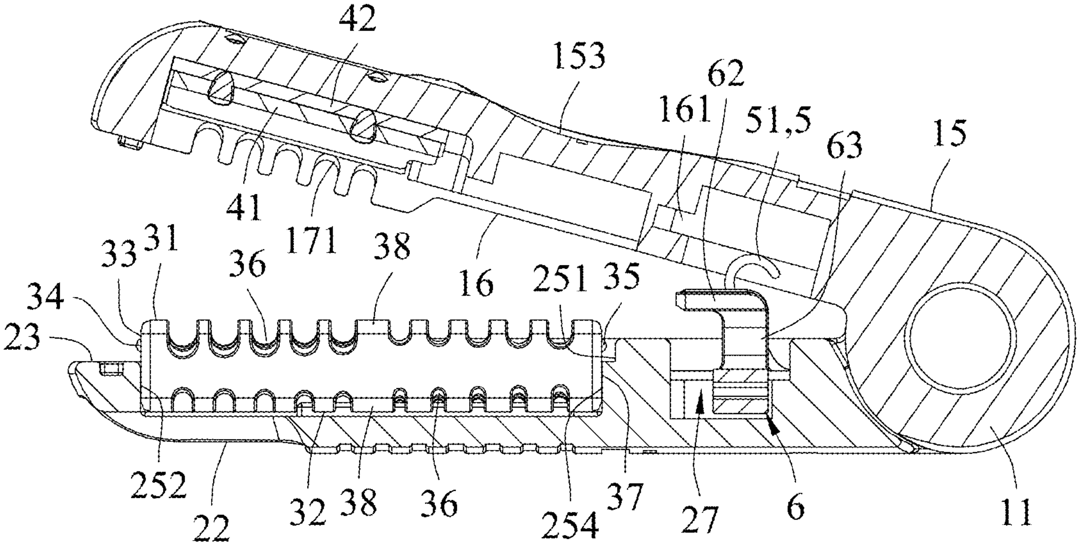
FIG. 6 is a cross-sectional view of the wire stripper according to the second embodiment of the disclosure.

Referring to FIG. 1, FIG. 2, FIG. 3A, FIG. 3B and FIG. 8, the stripping module 3 is detachably received in the receiving chamber 25. The user can shove the stripping module 3 out of the receiving chamber 25 through the opening 26. The stripping module 3 has a first surface 31, a second surface 32, a first abutting surface 33 and a second abutting surface 37. Both the first abutting surface 33 and the second abutting surface 37 have one edge connected to the first surface 31 and the other edge connected to the second surface 32. The first abutting surface 33 and the second abutting surface 37 are separated by a distance and are opposite each other. The first surface 31 and the second surface 32 are disposed on two opposing sides of the stripping module 3 respectively. Both the first abutting surface 33 and the second abutting surface 37 have at least one stopping block 34 and tenon 35. The stopping block 34 and the tenon 35 are beside each other. Regarding the first abutting surface 33, the stopping block 34 is closer to the first surface 31 than the tenon 35 is to the first surface 31. Regarding the second abutting surface 37, the tenon 35 is closer to the first surface 31 than the stopping block 34 is to the first surface 31. The tenon 35 is adapted to engage with the first positioning hole 2541 or the second positioning hole 2521. The stopping block 34 is adapted to engage with the first positioning hole 2541 or the second positioning hole 2521. Referring to FIG. 6 and FIG. 8, the first abutting surface 33 faces the second inner wall 252 to enable the tenon 35 to engage with the second positioning hole 2521, whereas the second abutting surface 37 faces the first inner wall 251 and the blocking block 254 to enable the stopping block 34 to engage with the first positioning hole 2541, allowing the stripping module 3 to be firmly received in the receiving chamber 25, but the disclosure is not limited thereto. The stripping module 3 can be shoved out of the receiving chamber 25 through the opening 26 and turned upside down to allow the second surface 32 to face the first bottom surface 16, allowing the first positioning hole 2541 and the second positioning hole 2521 to engage with different stopping blocks 34 and tenons 35. Referring to FIG. 3A and FIG. 3B, the first surface 31 and the second surface 32 have a first cutting zone 30A and a second cutting zone 30B beside the first cutting zone 30A respectively. The first abutting surface 33 is closer to the first cutting zone 30A than the second abutting surface 37 is to the first cutting zone 30A. The second abutting surface 37 is closer to the second cutting zone 30B than the first abutting surface 33 is to the second cutting zone 30B. Both the first cutting zone 30A and the second cutting zone 30B have at least one pressing groove 36 with a curved outline. The pressing grooves 36 correspond in position to the stripping holes 171 respectively. The pressing grooves 36 each have a diameter D1 and a mark 361 indicative of the diameter D1. The diameter D1 varies from pressing groove 36 to pressing groove 36. The user can place at least one wire 8 in the pressing grooves 36 according to the marks 361. The stripping module 3 can be changed efficiently by being shoved out of the receiving chamber 25 through the opening 26. The stripping module 3 can be turned upside down (to, for example, cause the first surface 31 to turn into the second surface 32), and thus the availability of the pressing grooves 36 of different diameters D1 is increased to enhance ease of use. Since the first surface 31 and the second surface 32 have the first cutting zone 30A and the second cutting zone 30B respectively, the stripping module 3 is not only capable of being turned upside down to be for use by the user, but also capable of changing sides, i.e., switching from the first cutting zone 30A to the second cutting zone 30B to correspond in position to the blade 42, so as to achieve the stripping of the wires 8 of different diameters D1.

Referring to FIG. 3A, FIG. 3B and FIG. 8, in this embodiment, the stopping blocks 34 and the tenons 35 of both the first abutting surface 33 and the second abutting surface 37 are in the number of two and one respectively. The stopping blocks 34 are of a smaller length than the tenons 35, but the disclosure is not limited thereto. The first surface 31 further has two positioning raised blocks 38 adjacent to each other. The two positioning raised blocks 38 are aligned in the first direction X. The two positioning raised blocks 38 are adapted to abut against the raised block 255 to allow the stripping module 3 to protrude slightly out of the receiving chamber 25, allowing the pressing grooves 36 and the stripping holes 171 to jointly form a plurality of stripping grooves A1. Referring to FIG. 3A and FIG. 3B, the two positioning raised blocks 38 are disposed between the first cutting zone 30A and the second cutting zone 30B. The first cutting zone 30A has five pressing grooves 36 equidistantly aligned, and the marks 361 are measurements in millimeters (mm), i.e., "3.0," "2.9," "2.8," "2.7" and "2.6." The second cutting zone 30B has five pressing grooves 36 equidistantly aligned, and the marks 361 are measurements in millimeters (mm), i.e., "2.5," "2.4," "2.3," "2.2" and "2.1." The marks 361 in the first cutting zone 30A are inverted relative to the marks 361 in the second cutting zone 30B, allowing the user to watch the marks 361 easily while changing the stripping module 3. In this embodiment, the second surface 32 is structurally identical to the first surface 31 substantially; for the sake of brevity, like components are denoted by like reference numerals and thus are no longer described in detail, restricting detail description to distinguishing technical features. The diameter D1 of the pressing grooves 36 on the second surface 32 is different from the diameter D1 of the pressing grooves 36 on the first surface 31, and the marks 361 are measurements in millimeters (mm), i.e., "2.0," "1.9," "1.8," "1.7," "1.6," "1.5," "1.4," "1.3," "1.2" and "1.1." The first surface 31 has the pressing grooves 36 of 10 different diameters D1, and the second surface 32 has the pressing grooves 36 of 10 different diameters D1, allowing the wires 8 of different diameters D1 to be stripped; thus, the user can dispense with the need to purchase the wire strippers A of different specifications, so as to minimize cost and save space.

Referring to FIG. 1, FIG. 2 and FIG. 5, the blade device 4 is detachably fixed to the first clamp component 1. The blade device 4 has a blade 42, a plate 41 and at least one screwing element 43. The blade 42 has at least one fastening hole 421. The fastening hole 421 is adapted to fix the screwing element 43 in place. The plate 41 has at least one fastening hole 411. The blade 42 is fastened to the plate 41 with the screwing element 43 by performing the manipulating steps as follows: placing the blade 42 in between the plate 41 and the first clamp component 1; and fastening them to each other with at least one the screwing element 43. In this embodiment, the fastening holes 411 of the plate 41 are in the number of two, the fastening holes 421 of the blade 42 are in the number of two, and the screw holes 151 are in the number of two, allowing the fastening holes 411 of the plate 41 to align with the fastening holes 421 of the blade 42, and the fastening holes 421 of the blade 42 to align with the screw holes 151 of the first clamp component 1. Thus, the plate 41, the blade 42 and the first clamp component 1 are penetrated by the two screwing element 43 and fastened together, causing the blade 42 and the plate 41 to lie oblique relative to the second bottom surface 23. With the screwing element 43 being used to fasten the blade 42 and the plate 41 together, the screwing element 43 can be removed to allow the user to change the blade 42 following its wear and tear so as to maintain a stable stripping effect.

Figure 4:
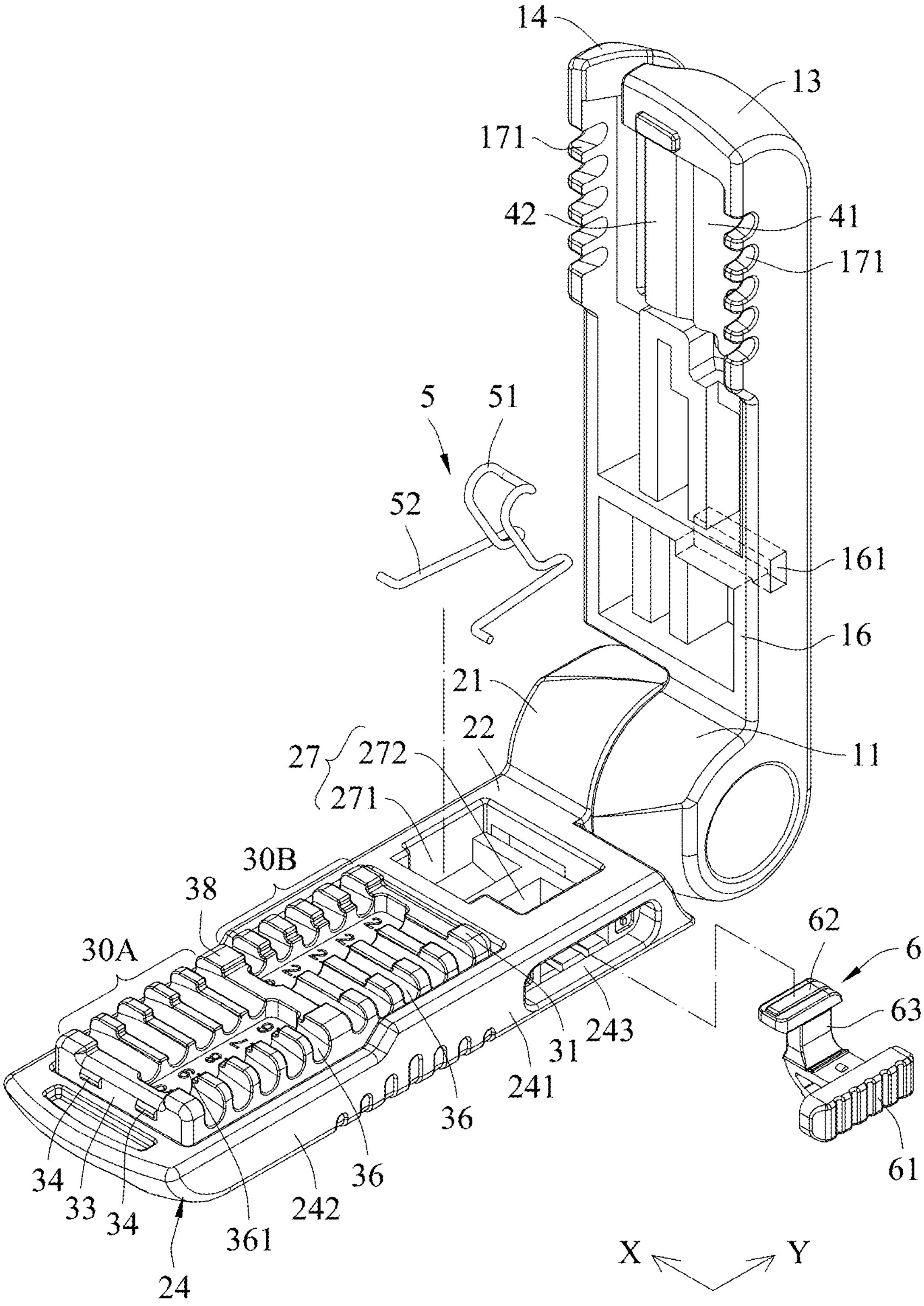
FIG. 4 is an exploded view of the wire stripper according to the second embodiment of the disclosure.
Figure 7:
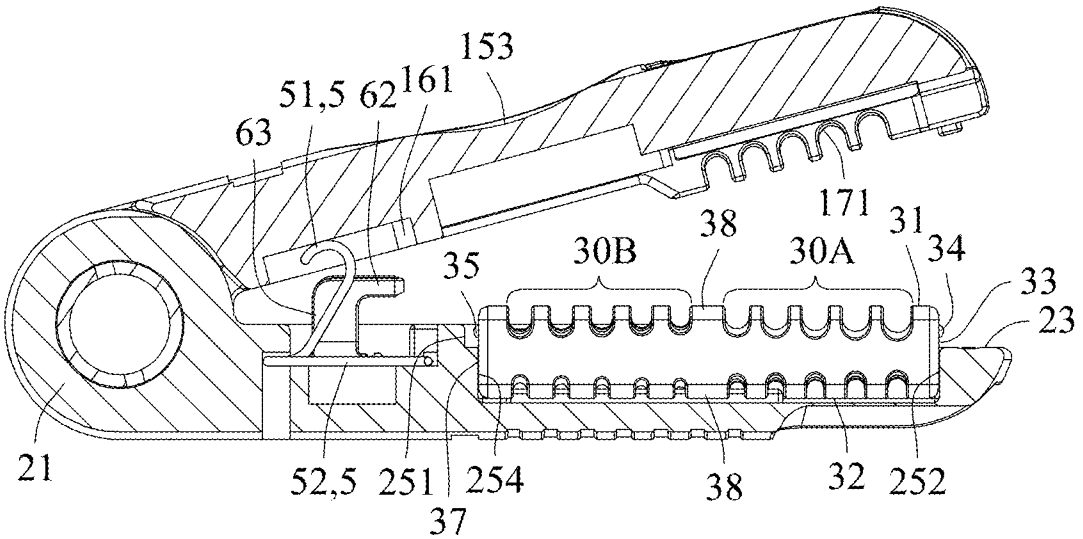
FIG. 7 is a cross-sectional view from another angle of the wire stripper according to the second embodiment of the disclosure.

Referring to FIG. 4 through FIG. 7, the second preferred embodiment of the disclosure is structurally identical to the first preferred embodiment of the disclosure substantially; for the sake of brevity, like components are denoted by like reference numerals and thus are no longer described in detail, restricting detail description to distinguishing technical features. Referring to FIG. 4 and FIG. 5, the disclosure further has a resilient element 5 and a switch structure 6. A holding chamber 27 is concavely disposed on the second bottom surface 23 of the second clamp component 2, and is beside the receiving chamber 25. The interior of the holding chamber 27 is generally divided into a first chamber 271 and a second chamber 272. The first chamber 271 receives the resilient element 5. The resilient element 5 has a bent segment 51 and a stabilizing segment 52. The stabilizing segment 52 engages with the first chamber 271 to allow the resilient element 5 to be firmly received in the holding chamber 27. As shown in FIG. 7, the bent segment 51 is adapted to abut against the first clamp component 1 to cause the first clamp component 1 to move in the direction of the second clamp component 2, because the resilient element 5 prevents the first clamp component 1 from abutting fully against the second clamp component 2. As shown in FIG. 5, the first clamp component 1 and the second clamp component 2 are open to allow the user to place therebetween the wire 8 to not only enhance ease of use but is also capable of automatically storing a use state after being shut.

Referring to FIG. 4 through FIG. 7, one of the sidewalls 24 of the second clamp component 2 has a switch hole 243, and the switch hole 243 penetrates the sidewall 24. The switch hole 243 is in communication with the holding chamber 27. Specifically speaking, the switch hole 243 is located at the first segment 241. The switch structure 6 has an operating end 61, an engaging-fixing end 62, and a joining portion 63 joining the operating end 61 to the engaging-fixing end 62. The joining portion 63 is received in the second chamber 272. The operating end 61 is received in the switch hole 243 and thus is received in one of the sidewalls 24. The engaging-fixing end 62 protrudes from the second chamber 272. As shown in FIG. 6, the user manipulates the operating end 61 to control the engaging-fixing end 62, and thus the switch structure 6 moves along the switch hole 243 in the second direction Y to allow the engaging-fixing end 62 to engage with an engaging hole 161 of the first clamp component 1. The engaging hole 161 sinks below the first bottom surface 16. As shown in FIG. 4, when the first clamp component 1 moves in the direction of the second clamp component 2, the resilient element 5 prevents the first clamp component 1 from abutting fully against the second clamp component 2 such that the operating end 61 moves in the second direction Y to drive the engaging-fixing end 62 moving; thus, the engaging-fixing end 62 engages with the engaging hole 161, and the resilient element 5 is compressed within the first chamber 271, so as to shut the first clamp component 1 and the second clamp component 2. As shown in FIG. 8, the wire stripper A can be stored easily without leaving the blade 42 exposed, minimizing safety risks.

The structural features and arrangement of the essential components of the wire stripper A according to the first embodiment and the second embodiment of the disclosure are described above. The operation and advantages of the wire stripper A of the disclosure are described below.

Figure 9A:
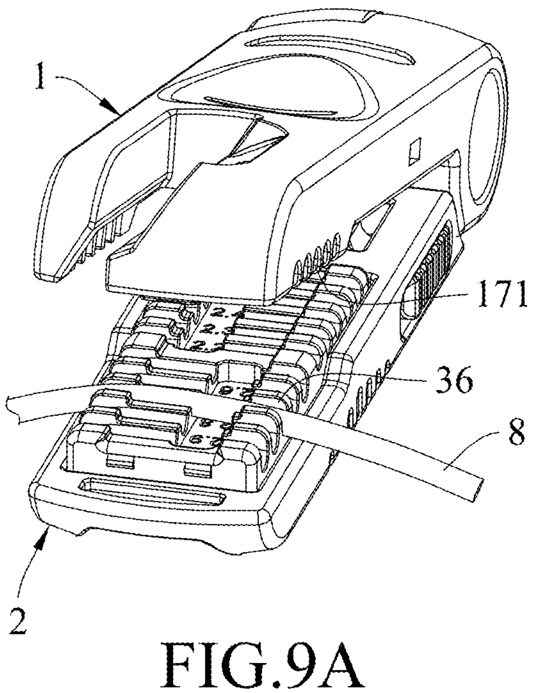
FIG. 9A is a schematic view of how the wire stripper of the disclosure operates.
Figure 9B:
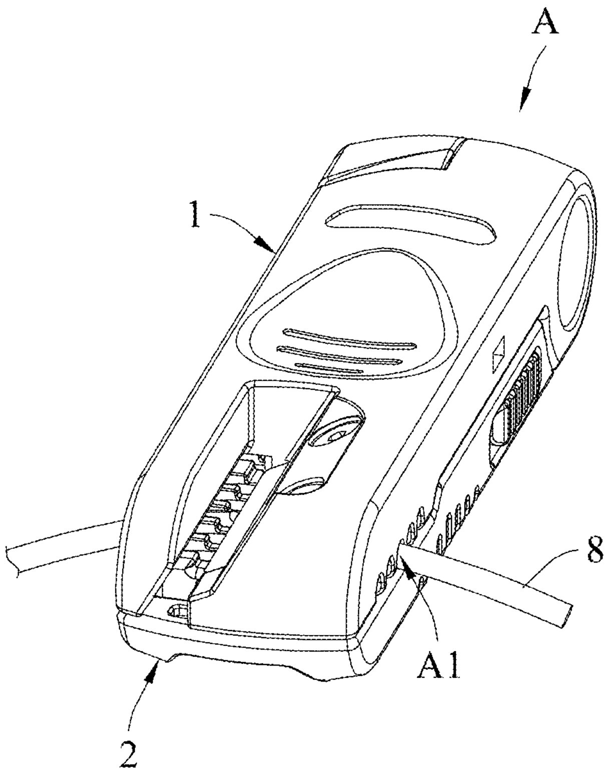
FIG. 9B is a schematic view of how the wire stripper of the disclosure operates.
Figure 9C:
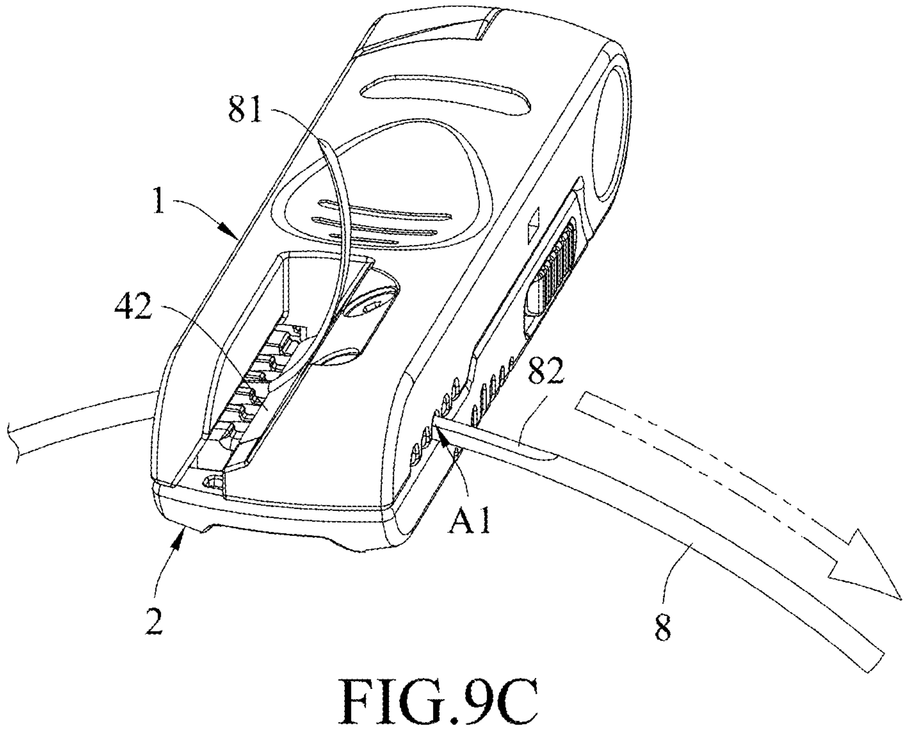
FIG. 9C is a schematic view of how the wire stripper of the disclosure operates.
Figure 9D:
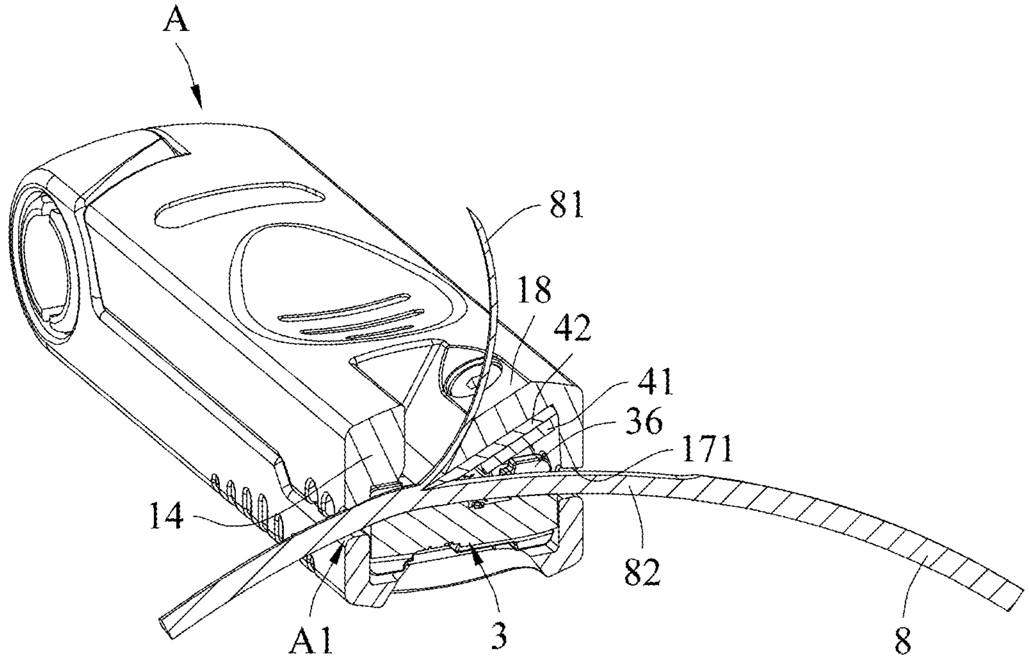
FIG. 9D is a cross-sectional view of how the wire stripper of the disclosure operates.

Referring to FIG. 9A through FIG. 9C, the mark 361 corresponding to the wire 8 to be pre-stripped is located according to the diameter of the wire 8, and the wire 8 is placed in the pressing groove 36. Since the stripping holes 171 of the first clamp component 1 are adapted to receive the wire 8 and penetrate the first clamp component 1, the user can press the pressing portion 153 to cause the first clamp component 1 to move in the direction of the second clamp component 2 to not only allow the first clamp component 1 and the second clamp component 2 to shut but also allow the wire 8 protruding from the stripping grooves A1 to be pulled in the first direction X. Specifically speaking, the user pulls the wire 8 in the vicinity of the first front end 13 so that the blade 42 cuts the wire 8 in motion; as a result, an outer insulating layer 81 of the wire 8 is peeled off to thereby expose an inner wire body 82 of the wire 8 to not only allow the outer insulating layer 81 and the wire body 82 to be separated by the blade 42 but also allow the outer insulating layer 81 to protrude from the notch 12 and along the abutting portion 18. As shown in FIG. 9D, the wire body 82 is pulled out of the stripping grooves A1 to thereby finish the stripping process, leaving the wire body 82 intact. Furthermore, the pressing portion 153 and the notch 12 are closely aligned in the second direction Y, whereas the wire 8 and the notch 12 are closely aligned in the first direction X; thus, the wire 8, the wire body 82 and the outer insulating layer 81 are visible while the wire 8 exposed from the stripping grooves A1 is being pulled, ensuring that the wire body 82 is unlikely to get damaged while the outer insulating layer 81 is being peeled off.

The wire stripper A of the disclosure is time-efficient because of a short effort arm and a long resistance arm. Moreover, the pressing grooves 36 come in different sizes to optimize space utilization.

What is claimed is:

1. A wire stripper, comprising:

a first clamp component having a first pivot portion, a notch, a first top surface, a first bottom surface and two first side surfaces, the first bottom surface connecting to an edge of each of the two first side surfaces, the first top surface connecting to another edge of each of the two first side surfaces and having at least one screw hole, an abutting portion being oblique and beside the screw hole, and a pressing portion being concave and beside the notch, and the first side surfaces each having a plurality of stripping holes;

a second clamp component having a second pivot portion pivotally connected to the first pivot portion to allow the first clamp component to open or shut relative to the second clamp component, a second top surface, a second bottom surface facing the first bottom surface, a receiving chamber being concave, and an opening penetrating the second top surface and being in communication with the receiving chamber;

a stripping module detachably coupled to the receiving chamber of the second clamp component and having a first surface and a second surface, the first and second surfaces having a first cutting zone and a second cutting zone beside the first cutting zone respectively, the first and second cutting zones each having at least one pressing groove, wherein the pressing grooves and the stripping holes together form at least one stripping groove, allowing a wire to be penetratingly disposed in the stripping groove; and a blade device detachably fixed to the first clamp component and having a blade, a plate and at least one screwing element, wherein the blade and the plate are fixed to the abutting portion with the screwing element and lie obliquely relative to the second bottom surface.

2. The wire stripper of claim 1, wherein the second clamp component has a holding chamber being concave and beside the receiving chamber.

3. The wire stripper of claim 2, wherein a resilient element is disposed in the receiving chamber and adapted to abut against the first clamp component.

4. The wire stripper of claim 2, wherein a switch structure is disposed in the receiving chamber and has an operating end, an engaging-fixing end, and a joining portion joining the operating end to the engaging-fixing end, the operating end being adapted to control the engaging-fixing end, and the joining portion being adapted to engage with an engaging hole of the first clamp component.

5. The wire stripper of claim 1, wherein the receiving chamber has a first positioning hole and a second positioning hole separated from the first positioning hole by a distance, and the stripping module has at least one stopping block protruding therefrom and a tenon beside the stopping block, with both the stopping block and the tenon adapted to engage with the first positioning hole or the second positioning hole.

6. The wire stripper of claim 1, wherein the pressing groove has a diameter and a mark indicative of the diameter.

* * * * *